US008751531B2

(12) United States Patent
Ishikawa et al.

(10) Patent No.: US 8,751,531 B2
(45) Date of Patent: Jun. 10, 2014

(54) TEXT MINING APPARATUS, TEXT MINING METHOD, AND COMPUTER-READABLE RECORDING MEDIUM

(75) Inventors: Kai Ishikawa, Tokyo (JP); Akihiro Tamura, Tokyo (JP); Shinichi Ando, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 13/060,608

(22) PCT Filed: Aug. 28, 2009

(86) PCT No.: PCT/JP2009/004210
§ 371 (c)(1),
(2), (4) Date: Feb. 24, 2011

(87) PCT Pub. No.: WO2010/023938
PCT Pub. Date: Mar. 4, 2010

(65) Prior Publication Data
US 2011/0161368 A1 Jun. 30, 2011

(30) Foreign Application Priority Data
Aug. 29, 2008 (JP) ................................. 2008-222454

(51) Int. Cl.
*G06F 17/30* (2006.01)
*G06F 17/27* (2006.01)
(52) U.S. Cl.
CPC ................................... *G06F 17/277* (2013.01)
USPC ......................................................... 707/776
(58) Field of Classification Search
CPC .............................. G06F 17/277; G10L 15/26

USPC ......................................................... 707/776
See application file for complete search history.

(56) References Cited

U.S. PATENT DOCUMENTS

| 5,617,488 A * | 4/1997 | Hong et al. .................... 382/229 |
| 6,185,527 B1 * | 2/2001 | Petkovic et al. .............. 704/231 |
| 2002/0178002 A1 * | 11/2002 | Boguraev et al. ............. 704/235 |
| 2003/0028566 A1 * | 2/2003 | Nakano ......................... 707/538 |

(Continued)

FOREIGN PATENT DOCUMENTS

| JP | 2001101194 A | 4/2001 |
| JP | 2004164079 A | 6/2004 |

(Continued)

OTHER PUBLICATIONS

International Search Report for PCT/JP2009/004210 mailed Nov. 2, 2009.

(Continued)

*Primary Examiner* — Apu Mofiz
*Assistant Examiner* — Dara J Glasser

(57) ABSTRACT

A text mining apparatus, a text mining method, and a program are provided that accurately discriminate inherent portions of each of a plurality of text data pieces including a text data piece generated by computer processing.
A text mining apparatus 1 to be used performs text mining using, as targets, a plurality of text data pieces including a text data piece generated by computer processing. Confidence is set for each of the text data pieces. The text mining apparatus 1 includes an inherent portion extraction unit 6 that extracts an inherent portion of each text data piece relative to another of the text data pieces, using the confidence set for each of the text data pieces.

27 Claims, 9 Drawing Sheets

(56) References Cited

U.S. PATENT DOCUMENTS

| | | | |
|---|---|---|---|
| 2004/0158558 A1* | 8/2004 | Koizumi et al. | 707/3 |
| 2004/0264652 A1* | 12/2004 | Erhart et al. | 379/88.01 |
| 2005/0283357 A1* | 12/2005 | MacLennan et al. | 704/4 |
| 2006/0206306 A1* | 9/2006 | Cao et al. | 704/4 |
| 2008/0140648 A1* | 6/2008 | Song et al. | 707/5 |

FOREIGN PATENT DOCUMENTS

| | | |
|---|---|---|
| JP | 2007026347 A | 2/2007 |
| JP | 2008039983 A | 2/2008 |
| WO | 2007066704 A | 6/2007 |
| WO | 2007138872 | 12/2007 |

OTHER PUBLICATIONS

H. Li et al., "Mining from Open Answers in Questionnaire Data", In Proceedings of the Seventh ACM SIGKDD International Conference on Knowledge Discovery and Data Mining, 2001, pp. 443-449.

F. Wessel et al., "Confidence Measures for Large Vocabulary Continuous Speech Recognition", IEEE Trans. Speech and Audio Processing, vol. 9, No. 3, Mar. 2001, pp. 288-298.

J. F. Pitrelli et al., "Confidence-Scoring Post-Processing for Off-Line Handwritten-Character Recognition Verification", In Proceedings of the Seventh International Conference on Document Analysis and Recognition (ICDAR), vol. 1, Aug. 2003, pp. 278-282.

\* cited by examiner

FIG. 2

| Call audio data | Call memo text data | Supplementary information |
|---|---|---|
| A : Thank you for calling. This is the Telephone Shopping Center. My name is Yamada.<br>B : Well, I just called because I saw your ads and liked the design of one of the electric pots. I'd like the electric pot that can boil water the most quickly in your ads.<br>A : I see. Then, I recommend that you buy the MP32 model.<br>B : Does it have a heat-retaining function?<br>A : No, it just has a boiling function.<br>B : Well, I think that would be fine as long as it can boil water the most quickly.<br>A : What color would you like? We have three colors, yellow, blue, and green.<br>B : I'd like white. Do you have a white color?<br>A : No, we don't. I'm sorry.<br>B : Well, then I choose yellow.<br>A : Thank you very much. Then, may I have your name and address?<br>B : · · · · ·<br>A : · · · · · | · She liked the design of our electric pots.<br><br>· Introduced MP32 because she wants the model that can boil water the most quickly.<br><br>· Explained the absence of heat-retaining function in MP32.<br><br>· Selected color is yellow.<br><br>· We need to consider a future increase in color variations.<br><br>· We also need to consider new addition of heat-retaining function. | [Identification]<br>0 8 0 8 3 3 3<br>[Operator]<br>Taro Yamada<br>[Customer name]<br>Hanako Suzuki<br>[Customer address]<br>· · · · ·<br>[Ordered product]<br>M P 3 2 − Y<br>[Form of payment]<br>· · · · · |

FIG. 4
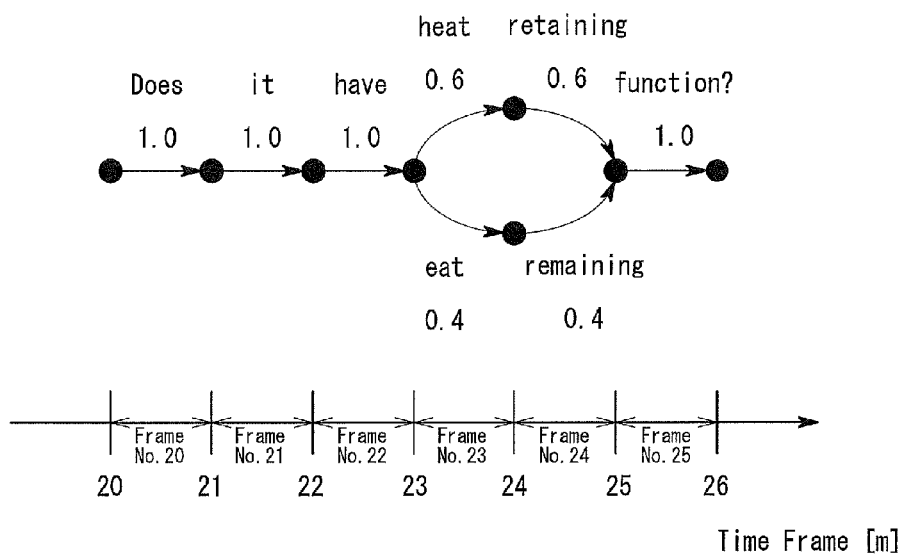
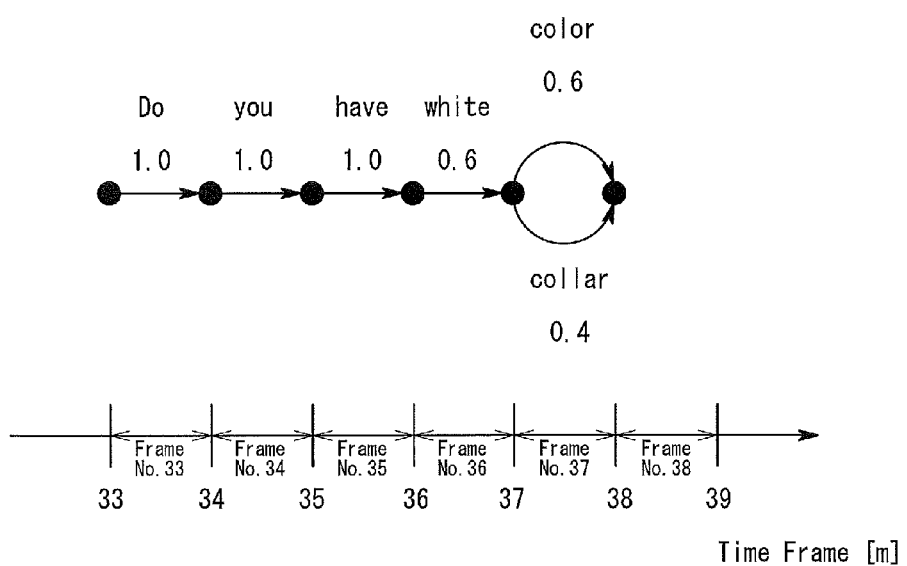

FIG. 5

| Speech-recognized text data | | Call memo text data | |
|---|---|---|---|
| Word $w_i$ | Score $S_{Call}(w_i, l)$ | Word $w_j$ | Score $S_{Memo}(w_j, l)$ |
| Ads | 0.745 | | |
| Saw | 0.174 | | |
| Electric pots | 0.006 | Electric pots | 0.010 |
| Design | 0.048 | Design | 0.070 |
| Liked | 0.023 | Liked | 0.030 |
| Water | 0.032 | | |
| Boil | 0.036 | Boil | 0.040 |
| Most | 0.047 | Most | 0.060 |
| Quickly | 0.137 | Quickly | 0.020 |
| Like | 0.046 | Like | 0.030 |
| Heat-retaining | 0.125 | Heat-retaining | 0.080 |
| Function | 0.015 | Function | 0.020 |
| Has | 0.062 | | |
| White | 0.862 | | |
| Like | 0.026 | | |
| Have | 0.004 | Have | 0.010 |
| Color | 0.036 | Color | 0.050 |
| Yellow | 0.041 | Yellow | 0.060 |
| | | Future | 0.800 |
| | | Color variations | 0.800 |
| | | Increase | 0.800 |
| | | New | 0.800 |
| | | Addition | 0.800 |
| | | Consider | 0.800 |

FIG. 6

| Speech-recognized text data |||| 
|---|---|---|---|
| Feature word | Frequency of appearance | Total frequency of appearance | Feature level |
| Ads | 1 1 | 1 2 | 0. 1 5 |
| White | 1 5 | 1 8 | 0. 1 7 |
| Black | 7 | 9 | 0. 0 8 |
| . | . | . | . |
| . | . | . | . |
| . | . | . | . |

| Call memo text data |||| 
|---|---|---|---|
| Feature word | Frequency of appearance | Total frequency of appearance | Feature level |
| Future | 1 0 | 1 2 | 0. 1 4 |
| Color variations | 8 | 1 1 | 0. 2 0 |
| Increase | 8 | 1 0 | 0. 2 0 |
| New | 6 | 8 | 0. 0 9 |
| Addition | 7 | 7 | 0. 0 6 |
| Consider | 5 | 5 | 0. 3 5 |

TEXT MINING APPARATUS, TEXT MINING METHOD, AND COMPUTER-READABLE RECORDING MEDIUM

TECHNICAL FIELD

The present application is the National Phase of PCT/JP2009/004210, filed Aug. 28, 2009, which claims priority based on Japanese patent application No. 2008-222454 filed on Aug. 29, 2008.

The present invention relates to a text mining apparatus and a text mining method using text data obtained by speech recognition as a target for mining.

BACKGROUND ART

In recent years, text mining has been attracting attention as technology for extracting useful information from huge amounts of text data. Text mining is the process of dividing a collection of non-standardized text into words or phrases with use of natural language analysis methods and extracting feature words. The frequencies of appearance of the feature words and their correlations are then analyzed to provide the analyst with useful information. Text mining enables analysis of huge amounts of text data that has been impossible to achieve with manpower.

One exemplary application area for such text mining is free-response format questionnaires. In this case, text mining is performed on text data obtained by typing responses to a questionnaire or recognizing characters therein (see PTLs 1 and 2 and NPL 1, for example). Using the results of the text mining, the analyst is able to perform various analyses and verification of hypotheses.

Another exemplary application area for text mining is company call centers. Call centers accumulate a huge volume of audio obtained by recording calls between customers and operators, and a huge amount of memos created by operators with key entry or the like when answering calls. Such information has become an important knowledge source in recent years for companies to get to know consumer needs, what should be improved in their own products and services, and so on.

Text mining, when applied to call centers, is performed on either text data obtained by speech recognition of calls (speech-recognized text data) or text data obtained from call memos created by operators (call memo text data). Which text data is to undergo text mining is determined depending on the viewpoint of the analysis required by the analyst.

For example, the speech-recognized text data covers all calls between operators and consumers. Thus, when the purpose is to extract consumer requests for products and services, text mining is performed on the speech-recognized text data because in that case the utterances of all consumers need to be covered.

Meanwhile, the call memo text data covers a narrower range, but it includes matters determined as important by operators during calls and furthermore matters recognized or determined as necessary to record by operators who took cues from the contents of calls. Accordingly, text mining is performed on the call memo text data in cases where analyses are required to focus on additional information about operators, such as where information to be extracted is, for example, decision know-how of experienced operators that should be shared with other operators, or erroneous decisions made by newly-hired operators.

The speech-recognized text data, however, contains recognition errors in most cases. For this reason, when performing text mining on the speech-recognized text data, feature words may not be extracted precisely due to the influence of possible recognition errors. In order to solve this problem, it has been proposed (see PTL 3, for example) that text mining be performed using speech-recognized text data in which confidence has been assigned to each word candidate obtained by speech recognition (see NPL 2, for example). In the text mining described in PTL 3, correction based on the confidence is performed when the number of extracted feature words is counted, and accordingly the influence of recognition errors is reduced.

Text mining on speech-recognized text data is required also in areas other than the above-described call center. These areas include, for example, cases where the perception of a company is to be analyzed from reported content on television or by radio, and where conversations in communication settings such as meetings are to be analyzed. In the former case, speech-recognized text data obtained by speech recognition of the utterances of announcers or the like is used. In the latter case, speech-recognized text data obtained by speech recognition of conversations among participants in communication settings such as meetings is used.

Now, the speech-recognized text data and the call memo text data mentioned in the above example of a call center are information obtained from the same event (telephone call) via different channels. Both pieces of information are obtained via different channels but have the same information source. Accordingly, it is conceivable that if text mining is performed making use of the characteristics of both information and using both information complementarily, more complex analysis would be possible than in the case where text mining is performed on only one of the text data pieces, or simply on each text data piece separately.

Specifically, the speech-recognized text data is first divided into portions that are common to the call memo text data, and portions that are inherent in call audio and are not described in the call memo text data. Similarly, the call memo text data is divided into portions common to the speech-recognized text data and portions that are inherent in call memos and not described in the speech-recognized text data.

Then, text mining is performed on the portions of the speech-recognized text data that are inherent in call audio. This text mining puts emphasis on the analysis of information that appears in call audio but is not included in the description of call memos. Through this analysis, information that should have been recorded as call memos but has been left out is extracted. Such extracted information can be used to improve description guidelines for creating call memos.

Subsequently, text mining is performed on the portions of the call memo text data that are inherent in call memos. This text mining puts emphasis on the analysis of information that appears in call memos but does not appear in the speech-recognized text data of call audio. Through this analysis, decision know-how of experienced operators is extracted more reliably than in the above-described case where text mining is performed on the call memo text data only. Such extracted decision know-how can be utilized as educational materials for newly-hired operators.

The above text mining performed on a plurality of text data pieces obtained from the same event via different channels (hereinafter referred to as "cross-channel text mining") can also be used in other examples.

For instance, in cases where the perception of a company is to be analyzed from reported content as described above, cross-channel text mining is performed on speech-recognized text data generated from the utterances of announcers or the like and on text data such as speech drafts or newspaper articles. Furthermore, in cases where conversations in communication settings such as meetings are to be analyzed as described above, cross-channel text mining is performed on speech-recognized text data obtained from conversations among participants and on text data such as documents referred to by participants in situ, memos created by participants, and minutes of meetings.

Note that, in cross-channel text mining, a target for mining does not necessarily need to be speech-recognized text data or text data created with key entry. A target for mining may, for example, be character-recognized text data obtained by character recognition of questionnaires, minutes of meetings or the like as mentioned above (see NPL 3).

Moreover, it is important, when performing cross-channel text mining, to clearly divide common portions and inherent portions of one text data piece relative to another text data piece. This is because analysis accuracy will decrease significantly if such division is unclear.

CITATION LIST

Patent Literature

PTL 1: JP2001-101194A
PTL 2: JP2004-164079A
PTL 3: JP2008-039983A

Non Patent Literature

NPL 1: H. Li and K. Yamanishi, "Mining from Open Answers in Questionnaire Data", In Proceedings of the Seventh ACM SIGKDD International Conference on Knowledge Discovery and Data Mining, pp. 443-449, 2001.
NPL 2: Frank Wessel et al., "Confidence Measures for Large Vocabulary Continuous Speech Recognition", IEEE Trans. Speech and Audio Processing, vol. 9, No. 3, March 2001, pp. 288-298.
NPL 3: John F. Pitrelli, Michael P. Perrone, "Confidence-Scoring Post-Processing for Off-Line Handwritten-Character Recognition Verification", In Proceedings of the Seventh International Conference on Document Analysis and Recognition (ICDAR), vol. 1, August 2003, pp. 278-282.

SUMMARY OF INVENTION

Problem to be Solved by the Invention

Text data pieces generated by computer processing such as speech recognition or character recognition, however, contain errors in most cases. This makes it enormously difficult to discriminate and divide inherent portions and common portions of the text data pieces generated by computer processing relative to other text data pieces generated in another way. Consequently, practical implementation of cross-channel text mining is also difficult.

Moreover, although PTL 3 above discloses a technique for reducing the influence of speech recognition errors on text mining if there is such influence as described above, this technique does not take into consideration the application to cross-channel text mining. That is, the invention of PTL 3 is not intended for eliminating the influence that recognition errors have on the process of discrimination of inherent portions and common portions of speech-recognized text data pieces relative to other text data pieces.

It is an object of the present invention to solve the above-described problems and provide a text mining apparatus, a text mining method, and a computer-readable recording medium that accurately discriminates inherent portions of each of a plurality of text data pieces including a text data piece generated by computer processing.

Means for Solving Problem

In order to achieve the above object, a text mining apparatus according to the present invention is a text mining apparatus for performing text mining using, as targets, a plurality of text data pieces including a text data piece generated by computer processing, confidence being set for each of the text data pieces, the text mining apparatus including an inherent portion extraction unit that extracts an inherent portion of each text data piece relative to another of the text data pieces, using the confidence set for each of the text data pieces.

Furthermore, in order to achieve the above object, a text mining method according to the present invention is a text mining method for performing text mining using, as targets, a plurality of text data pieces including a text data piece generated by computer processing, the text mining method including the steps of (a) setting confidence for each of the text data pieces, and (b) extracting an inherent portion of each text data piece relative to another of the text data pieces, using the confidence set for each of the text data pieces in the step (a).

Moreover, in order to achieve the above object, a computer-readable recording medium according to the present invention is a computer-readable recording medium that records a program for causing a computer device to perform text mining using, as targets, a plurality of text data pieces including a text data piece generated by computer processing, the program including instructions that cause the computer device to perform the steps of (a) setting confidence for each of the text data pieces, and (b) extracting an inherent portion of each text data piece relative to another of the text data pieces, using the confidence set for each of the text data pieces in the step (a).

Effects of the Invention

As described above, a text mining apparatus, a text mining method, and a computer-readable recording medium according to the present invention achieves accurate discrimination of inherent portions of each of a plurality of text data pieces including a text data piece generated by computer processing.

BRIEF DESCRIPTION OF DRAWINGS

FIG. 2 is a diagram showing an example of data pieces targeted for text mining according to Exemplary Embodiment 1 of the present invention.

FIG. 4 is a diagram showing an example of speech-recognized text data whose confidence has been set, in the case where the language is English.

FIG. 5 is a diagram showing an example of inherent portions extracted by the text mining apparatus according to Exemplary Embodiment 1 of the present invention.

FIG. 6 is a diagram showing an example of the results of text mining processing.

DESCRIPTION OF THE INVENTION

Exemplary Embodiment 1

Below is a description of a text-mining apparatus, a text mining method, and a program according to Exemplary Embodiment 1. of the present invention with reference to FIGS. 1 to 7. First, a description is given of the configuration of the text mining apparatus according to Exemplary Embodiment 1 of the present invention with reference to FIGS. 1 to 6.

Figure 1:
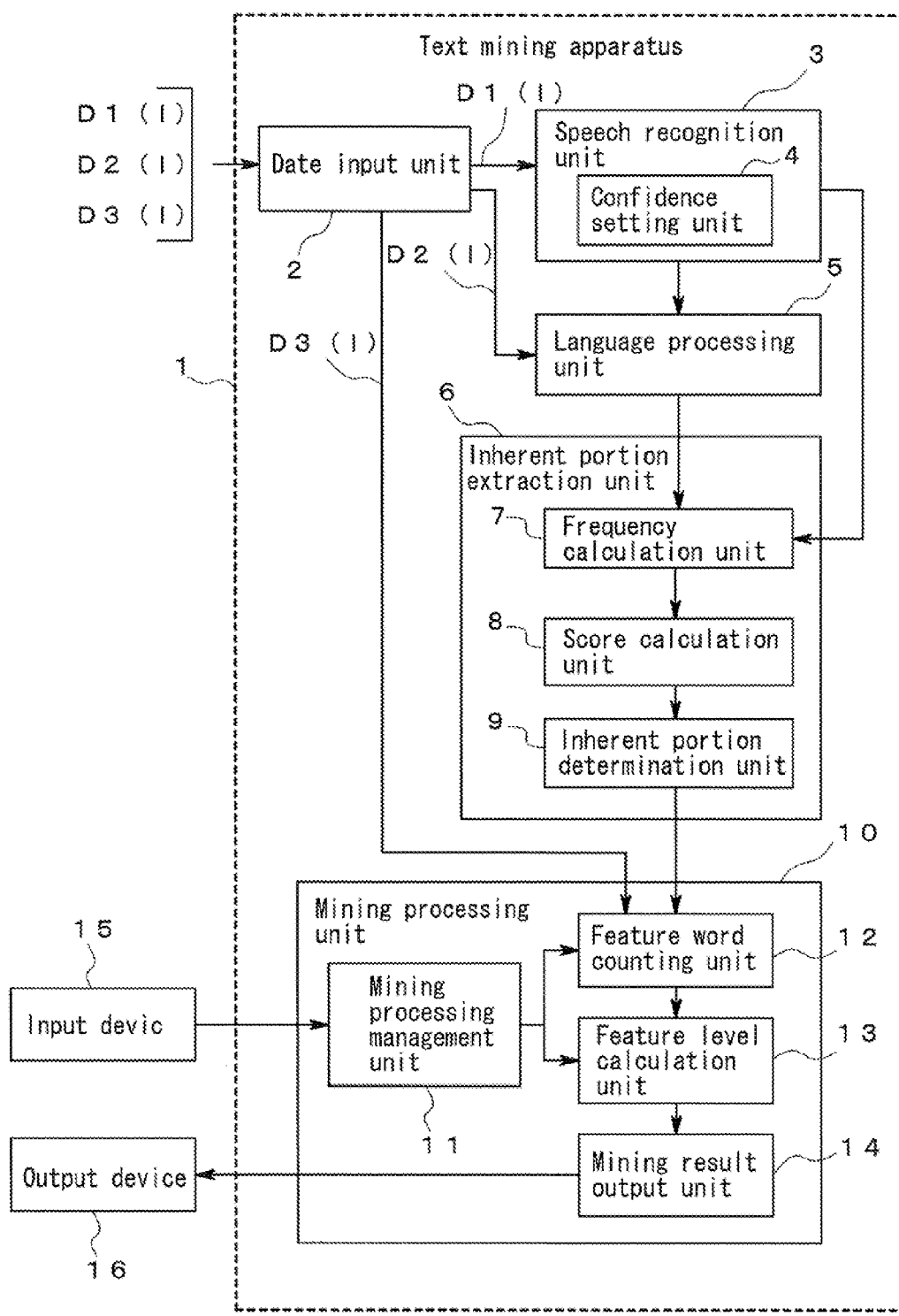
FIG. 1 is a block diagram showing a schematic configuration of a text mining apparatus according to Exemplary Embodiment 1 of the present invention.
Figure 3:
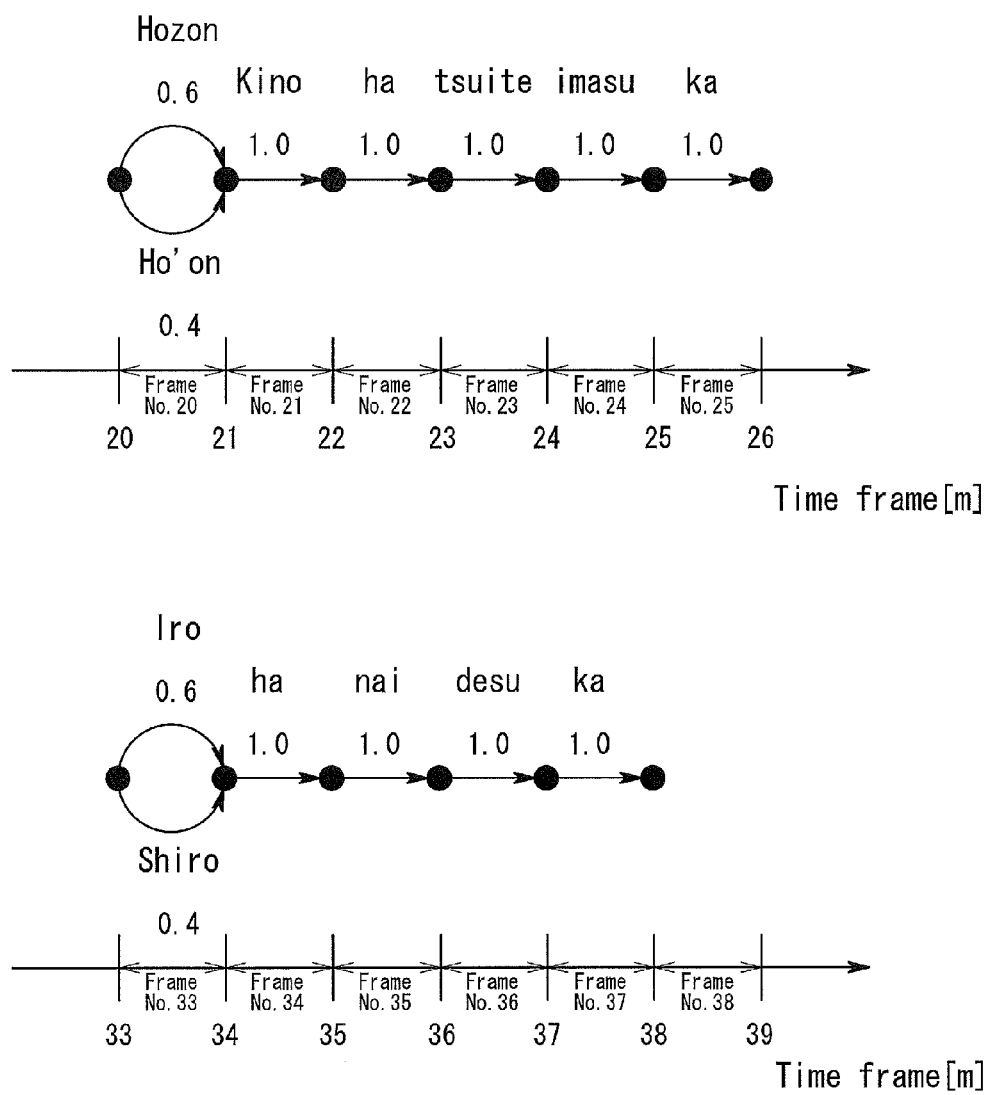
FIG. 3 is a diagram showing an example of speech-recognized text data whose confidence has been set.

FIG. 1 is a block diagram showing a schematic configuration of a text mining apparatus according to Exemplary Embodiment 1 of the present invention. FIG. 2 is a diagram showing an example of data pieces targeted for text mining according to Exemplary Embodiment 1 of the present invention. FIG. 3 is a diagram showing an example of speech-recognized text data whose confidence has been set. FIG. 4 is a diagram showing an example of speech-recognized text data whose confidence has been set in the case where the language is English. FIG. 5 is a diagram showing an example of inherent portions extracted by the text mining apparatus according to Exemplary Embodiment 1 of the present invention. FIG. 6 is a diagram showing an example of the results of text mining processing.

A text mining apparatus 1 shown in FIG. 1 performs text mining using, as targets, a plurality of text data pieces including a text data piece generated by computer processing. As shown in FIG. 1, the text mining apparatus 1 includes an inherent portion extraction unit 6. Confidence has been set for each of the text data pieces.

The inherent portion extraction unit 6 extracts an inherent portion of each of the plurality of text data pieces relative to the others, using the confidence set for each of the plurality of text data pieces. Here, the "inherent portion of each text data piece relative to the others" as used herein refers to a word or phrase in the text data piece that is not at all or just a little included in the other text data pieces.

The term "confidence" refers to the degree of appropriateness of words constituting text data. "Confidence" of, for example, text data generated by computer processing is an index of whether words constituting the text data are correct as the results of computer processing.

Accordingly, extraction of the inherent portion using the confidence by the inherent portion extraction unit 6 reduces the influence that computer processing errors have on the process of discrimination of the inherent portion of each of the text data pieces. As a result, since discrimination accuracy of the inherent portions is improved, the text mining apparatus 1 realizes cross-channel text mining that was conventionally difficult.

Note that the term "computer processing" as used in the present invention refers to analysis processing performed by a computer in accordance with a certain algorithm. Moreover, "text data obtained by computer processing" as used herein refers to text data automatically generated by computer processing. Specific examples of such computer processing include speech recognition processing, character recognition processing, and machine translation processing.

Following is a more detailed description of the configuration of the text mining apparatus 1. The below description is given of an example where the text mining apparatus 1 is applied to a call center. In Exemplary Embodiment 1, targets for mining are text data obtained by speech recognition (computer processing) of call audio data D1 recorded at the call center (see FIG. 2), and call memo text data D2 (see FIG. 2).

As shown in FIG. 1, the text mining apparatus 1 receives three types of data inputs, namely the call audio data D1, the call memo text data D2, and supplementary information D3, as shown in FIG. 2. The call audio data D1 is audio data obtained by recording conversations between operators and customers at the call center. In FIG. 2, "A" indicates the operator and "B" the customer. Text data obtained as a result of speech recognition of the call audio data D1 is the above-described speech-recognized text data.

The call memo text data D2 is text data created as memos by operators during calls, and it is not text data obtained by computer processing. The supplementary information D3 is data attached to the call audio data D1 and the call memo text data D2, and only part thereof is shown in FIG. 2. The supplementary information D3 is primarily used to calculate a feature level discussed later.

A call between an operator and a customer from the start to the end is treated as a single unit (single record) of the call audio data D1, and the call memo text data D2 and the supplementary information D3 are generated one piece each per record. FIG. 2 shows a single record of call audio data D1, call memo text data D2 corresponding thereto, and supplementary information D3 corresponding thereto. In practice, the call audio data D1($l$) for a single record with record number l, the call memo text data D2($l$) corresponding thereto, and the supplementary information D3($l$) corresponding thereto are grouped as one set, and the text mining apparatus 1 receives an input of a plurality of such sets. Note that "l" is a natural number from 1 to L (l=1, 2, . . . , L).

As shown in FIG. 1, the text mining apparatus 1 also includes a data input unit 2, a speech recognition unit 3, a language processing unit 5, and a mining processing unit 10, in addition to the inherent portion extraction unit 6. The text mining apparatus 1 is further connected to an input device 15 and an output device 16. Specific examples of the input device 15 include a keyboard and a mouse. Specific examples of the output device 16 include a display device, such as a liquid crystal display, and a printer. Alternatively, the input device 15 and the output device 16 may be installed on another computer device connected to the text mining apparatus 1 via a network.

First, input data including the call audio data D1($l$) for each record l, the corresponding call memo text data D2($l$), and the corresponding supplementary information D3($l$) is input to the data input unit 2. At this time, the data may be input directly to the data input unit 2 from an external computer device via the network, or may be provided in a form stored in a recording medium. In the former case, the data input unit 2 is an interface for connecting the text mining apparatus 1 to external equipment. In the latter case, the data input unit 2 is a reader.

Upon receiving an input of the data, the data input unit 2 outputs the call audio data D1($l$) to the speech recognition unit 3 and the call memo text data D2($l$) to the language processing unit 5. The data input unit 2 also outputs the supplementary information D3($l$) to the mining processing unit 10.

The speech recognition unit 3 performs speech recognition on the call audio data D1($l$) so as to generate speech-recognized text data. The speech recognition unit 3 includes a confidence setting unit 4. The confidence setting unit 4 sets confidence for each word constituting the speech-recognized text data. The speech-recognized text data whose confidence has been set is output to the inherent portion extraction unit 6.

Now, a description is given of processing performed by the speech recognition unit 3 with reference to FIGS. 3 and 4, using a conversation included in the call audio data D1 shown in FIG. 2. From among many phrases in the conversation included in the call audio data D1, the phrases "Does it have heat retaining function?" and "Do you have white color" are to be used.

First, the speech recognition unit 3 performs speech recognition on the call audio data D1(*l*) for each record l. The speech recognition unit 3 then extracts a word $w_i$ as a candidate per time frame m as shown in FIG. 3. In FIG. 3, the numbers shown on the horizontal axis denote frame numbers, and serial frame numbers are used for a single record l.

If there are a plurality of candidates within the same time frame m, the speech recognition unit 3 extracts a plurality of words. In the example of FIG. 3, two candidates "hozon" ("storage") and "ho'on" ("heat-retaining") are extracted from the frame with frame number 20. Similarly, two candidates "iro" ("color") and "shiro" ("white") are extracted from the frame with frame number 33.

In the case where the language used in conversations is English, the speech recognition unit 3 similarly extracts a word $w_i$ as a candidate per time frame m. For example, in the case of using the English translation of the conversation used in the example of FIG. 3, that is, using the phrases "Does it have heat retaining function?" and "Do you have white color?", the speech recognition unit 3 extracts words WI as shown in FIG. 4.

In the example of FIG. 4, two candidates "heat retaining" and "eat remaining" are extracted from the frames with frame numbers 223 and 24, and two candidates "color" and "collar" are extracted from the frame with frame number 37. In FIG. 4 as well, the numbers shown on the horizontal axis denote frame numbers, and serial frame numbers are used for a single record l.

Note that it is not necessary for the speech recognition unit 3 to extract all words as candidates. In Exemplary Embodiment 1, the speech recognition unit 3 is configured to extract only independent parts of speech such as nouns, verbs, and adverbs and not to extract words such as postpositional particles and prepositions that have no meaning by themselves, regardless of the type of language.

The confidence setting unit 4 sets confidence $R_{Call}(w_i, l, m)$ for each word $w_i$. In FIGS. 3 and 4, the numerical value of 1 or below written under each word represents confidence. Furthermore, in Exemplary Embodiment 1, the confidence $R_{Call}(w_i, l, m)$ is not particularly limited to this, as long as it is an index of whether words constituting the speech-recognized text data are correct as the results of recognition.

For example, the confidence $R_{Call}(w_i, l, m)$ may be "confidence measures" as disclosed in NPL 2 above. Specifically, input audio or an acoustic feature quantity obtained from observation of the input audio is assumed to be given as a precondition. In this case, the confidence $R_{Call}(w_i, l, m)$ of a word $w_i$ can be calculated as the posterior probability of the word $w_i$ using a forward-backward algorithm, based on word graphs obtained as a result of recognition of the input audio or the acoustic feature quantity.

Alternatively, in Exemplary Embodiment 1, a mode is possible in which speech recognition is performed in advance by a speech recognition device outside the text mining apparatus 1, and speech-recognized text data in which confidence has been set for each word has already been created prior to input to the text mining apparatus 1. In this case, it is not necessary for the text mining apparatus 1 to include the speech recognition unit 3, and speech-recognized text data is input via the data input unit 2 to the inherent portion extraction unit 6. However, providing the speech recognition unit 3 in the text mining apparatus 1 facilitates control of language or acoustic models used in speech recognition, and accordingly improves speech recognition accuracy.

The language processing unit 5 performs language processing such as morphological analysis, dependency analysis, synonym processing, and unnecessary word processing on the call memo text data. The language processing unit 5 also generates a word sequence by dividing the call memo text data into words $w_j$ that correspond to words $w_i$ in the speech-recognized text data. The word sequence is output to the inherent portion extraction unit 6.

In Exemplary. Embodiment 1, the inherent portion extraction unit 6 calculates a score $S_{Call}(w_i, l)$ or $S_{Memo}(w_j, l)$ for each word constituting each text data piece and extracts an inherent portion of each text data piece based on the calculated value. The score $S_{Call}(w_i, l)$ shows the degree to which each word constituting speech-recognized text data corresponds to an inherent portion of the speech-recognized text data. The score $S_{Memo}(w_j, l)$ shows the degree to which each word constituting call memo text data corresponds to an inherent portion of the call memo text data.

In order to achieve the above function, the inherent portion extraction unit 6 includes a frequency calculation unit 7, a score calculation unit 8, and an inherent portion determination unit 9. The frequency calculation unit 7 receives an input of speech-recognized text data obtained from the call audio data D1(*l*) in each record l and the word sequence generated from the call memo text data D2(*l*) by the language processing unit 5.

The frequency calculation unit 7 first calculates confidence $R_{Call}(w_i, l)$ for each record l, using the confidence $R_{Call}(w_i, l, m)$ that has already been obtained for each word $w_i$ constituting the speech-recognized text data. Specifically, the frequency calculation unit 7 performs calculation on all words $w_i$, using the following equation (Equation 1).

$$R_{Call}(w_i, l) = 1.0 - \prod_m (1.0 - R_{Call}(w_i, l, m)) \qquad \text{[Equation 1]}$$

The frequency calculation unit 7 then sets confidence $R_{Memo}(w_j, l)$ for each word $w_j$ constituting the call memo text data, using the word sequence output from the language processing unit 5. In Exemplary Embodiment 1, the confidence is set also for the call memo text data, which also improves discrimination accuracy of the inherent portion.

In Exemplary Embodiment 1, however, the call memo text data is created by operators with key entry. Thus the confidence of a word which is included in the call memo text data is "1.0". Note the confidence of a word which is not included in the call memo text data is "0.0".

Subsequently, the frequency calculation unit 7 obtains the frequencies of appearance $N_{Call}(w_i)$ and $N_{Memo}(w_j)$ of respective words $w_i$ and $w_j$, based on the confidence $R_{Call}(w_i, l)$ of the words $w_i$ and the confidence $R_{Memo}(w_j, l)$ of the words $w_j$. The frequency calculation unit 7 also obtains the frequencies of co-appearance $N_{Call,Memo}(w_i, w_j)$ of the both for every record (records (1) to (L)), based on the confidence $R_{Call}(w_i, l)$ and the confidence $R_{Memo}(w_j, l)$.

Specifically, the frequency calculation unit 7 obtains frequencies of appearance $N_{Call}(w_i)$ of words $w_i$ from the following equation (Equation 2) and the frequencies of appearance $N_{Memo}(w_j)$ of words $w_j$ from the following equation (Equation 3). The frequency calculation unit 7 also obtains the frequencies of co-appearance $N_{Call, Memo}$ ($w_i$, $w_j$) from the following equation (Equation 4). Thereafter, the frequency calculation unit 7 outputs the frequencies of appearance $N_{Call}$ ($w_i$), the frequencies of appearance $N_{Memo}$ ($w_j$), and the frequencies of co-appearance $N_{Call,Memo}$ ($w_i$, $w_j$) to the score calculation unit 8.

$$N_{Call}(w_i) = \sum_l R_{Call}(w_i, l) \qquad \text{[Equation 2]}$$

$$N_{Memo}(w_j) = \sum_l R_{Memo}(w_j, l) \qquad \text{[Equation 3]}$$

$$N_{Call,Memo}(w_i, w_j) = \sum_l R_{Call}(w_i, l) R_{Memo}(w_j, l) \qquad \text{[Equation 4]}$$

The score calculation unit 8 calculates the score $S_{call}$ ($w_i$, l) and $S_{Memo}$ ($w_j$, l) described above, using the frequencies of appearance $N_{Call}$ ($w_i$), the frequencies of appearance $N_{Memo}$ ($w_j$), and the frequencies of co-appearance $N_{Call,Memo}$ ($w_i$, $w_j$). Specifically, the score calculation unit 8 firstly calculates mutual information amounts I ($w_i$; $w_j$) where $w_i$ and $w_j$ are discrete random variables.

It is assumed herein that "L" is the total number of records that are targeted for the calculation of the frequencies of appearance $N_{Call}$ ($w_i$), the frequencies of appearance $N_{Memo}$ ($w_j$), and the frequencies of co-appearance $N_{Call,Memo}$ ($w_i$, $w_j$). Moreover, let $P_{Call,Memo}$ ($w_i$, $w_j$) be the joint distribution function of the mutual information amount I ($w_i$; $w_j$). $P_{Cell, Memo}$ ($w_i$, $w_j$) can be calculated from the following equation (Equation 5).

$$P_{Call,Memo}(w_i, w_j) = N_{Call,Memo}(w_i, w_j)/L \qquad \text{[Equation 5]}$$

It is obvious from the above equation (Equation 5) that $P_{Call,Memo}$ ($w_i$, $w_j$) is the joint distribution function of the probability event that a word $w_i$ will appear in speech-recognized text data Call and a word $w_j$ will appear in call memo text data Memo for a certain single record.

Moreover, let $P_{Call}$ ($w_i$) and $P_{Memo}$ ($w_j$) be the marginal probability distribution functions of the mutual information amount I ($w_i$; $w_j$). $P_{Call}$ ($w_i$) is calculated from the following equation (Equation 6). $P_{Memo}$ ($w_j$) is calculated from the following equation (Equation 7).

$$P_{Call}(w_i) = N_{Call}(w_i)/L \qquad \text{[Equation 6]}$$

$$P_{Memo}(w_j) = N_{Memo}(w_j)/L \qquad \text{[Equation 7]}$$

It is obvious from the above equation (Equation 6) that $P_{Call}$ ($w_i$) is the marginal probability distribution function of the probability event that a word $w_i$ will appear in speech-recognized text data Call for a certain single record. It is also obvious from the above equation (Equation 7) that $P_{Memo}$ ($w_j$) is the marginal probability distribution function of the probability event that a word $w_j$ will appear in the call memo text data Memo for a certain single record.

Then, the mutual information amount I ($w_i$; $w_j$) where $w_i$ and $w_j$ are discrete random variables can be calculated from the following equation (Equation 8).

$$I(w_i; w_j) = P_{Call,Memo}(w_i, w_j) \log \frac{P_{Call,Memo}(w_i, w_j)}{P_{Call}(w_i) P_{Memo}(w_j)} + [P_{Call}(w_i) - P_{Call,Memo}(w_i, w_j)] \qquad \text{[Equation 8]}$$

-continued $$\log \frac{[P_{Call}(w_i) - P_{Call,Memo}(w_i, w_j)]}{P_{Call}(w_i)[1.0 - P_{Memo}(w_j)]} + [$$

$$P_{Memo}(w_j) - P_{Call,Memo}(w_i, w_j)] \log$$

$$\frac{[P_{Memo}(w_j) - P_{Call,Memo}(w_i, w_j)]}{[1.0 - P_{Call}(w_i)] P_{Memo}(w_j)} + [1.0 -$$

$$P_{Call}(w_i) - P_{Memo}(w_j) + P_{Call,Memo}(w_i, w_j)] \log$$

$$\frac{[1.0 - P_{Call}(w_i) - P_{Memo}(w_j) + P_{Call,Memo}(w_i, w_j)]}{[1.0 - P_{Call}(w_i)][1.0 - P_{Memo}(w_j)]}$$

Next, the score calculation unit 8 calculates the scores $S_{call}$ ($w_i$, l) and $S_{Memo}$ ($w_j$, l) using the mutual information amounts I ($w_i$; $w_j$). In Exemplary Embodiment 1, the scores $S_{call}$ ($w_i$, l) and $S_{Memo}$ ($w_j$, l) are functions that decrease monotonically relative to the mutual information amount I ($w_i$; $w_j$). Specifically, the score $S_{call}$ ($w_i$, l) is calculated from the following equation (Equation 9), and the score $S_{Memo}$ ($w_j$, l) is calculated from the following equation (Equation 10). Note that in Equations 9 and 10, β is an arbitrary constant greater than zero. The calculated scores $S_{call}$ ($w_i$, l) and $S_{Memo}$ ($w_j$, l) are output to the inherent portion determination unit 9.

$$S_{Call}(w_i, l) = \exp\left[-\beta \sum_{w_j \in Memo(l)} I(w_i; w_j)\right] \qquad \text{[Equation 9]}$$

$$S_{Memo}(w_j, l) = \exp\left[-\beta \sum_{w_i \in Call(l)} I(w_i; w_j)\right] \qquad \text{[Equation 10]}$$

The scores calculated in this way vary depending on the confidence values set for the speech-recognized text data and the call memo text data. That is, the scores also vary depending on recognition errors that may occur during speech recognition. Thus using the scores $S_{call}$ ($w_i$, l) and $S_{Memo}$ ($w_i$, l) improves accuracy of determination of the below-described inherent portion.

Note that in Exemplary Embodiment 1, the method for calculating the scores $S_{call}$ ($w_i$, l) and $S_{Memo}$ ($w_j$, l) is not limited to the calculation method described above. It is sufficient to use any method in which the scores $S_{call}$ ($w_i$, l) and $S_{Memo}$ ($w_j$, l) can be used to determine inherent portions.

The inherent portion determination unit 9 compares the scores $S_{call}$ ($w_i$, l) and $S_{Memo}$ ($w_j$, l) with preset threshold values and determines whether or not corresponding words are inherent portions. In Exemplary Embodiment 1, the inherent portion determination unit 9 determines each word as an inherent portion when the score of that word is greater than or equal to a threshold value. For example, it is assumed, as shown in FIG. 5, that scores are calculated for both of words $w_i$ constituting the speech-recognized text data and words $w_j$ constituting the call memo text data, and threshold values for both of the scores $S_{call}$ ($w_i$, l) and $S_{Memo}$ ($w_j$, l) are set to 0.500.

In this case, the inherent portion determination unit 9 extracts the words "ads" and "white" as inherent portions of the speech-recognized text data. The inherent portion determination unit 9 also extracts the words "future", "color variations", "increase", "new", "addition", and "consider" as inherent portions of the call memo text data.

In Exemplary Embodiment 1, the magnitude of the threshold values is not particularly limited, and may be selected as appropriate based on the results of below-described text mining processing. It is, however, preferable in cross-channel text mining that experiments be conducted in advance and threshold values be set based on experimental results in order to obtain favorable results.

Specifically, the scores $S_{call}(w_i, l)$ and $S_{Memo}(w_j, l)$ are calculated with the aforementioned procedure, using audio data whose inherent portions have been preset and text data whose inherent portions have likewise been preset as experimental data. Then, the threshold values are set so that the preset inherent portions of each data piece are to be extracted. In this case, the threshold value can be set for each type of score. It is also preferable that as much experimental data as possible be prepared in order to increase confidence of the threshold values that is set.

The mining processing unit 10 is capable of performing mining processing on each of the inherent portions of the speech-recognized text data and the call memo text data. In other words, the mining processing unit 10 is capable of performing so-called cross-channel text mining. Thus the text mining apparatus 1 realizes deeper analysis than a conventional text mining apparatus that is not capable of performing cross-channel text mining.

Note that the mining processing unit 10 is capable of performing text mining other than cross-channel text mining, that is, text mining on whole speech-recognized text data or whole call memo text data.

Moreover, the mining processing unit 10 in Exemplary Embodiment 1 extracts feature words and calculates feature levels thereof as mining processing. The term "feature word" as used herein refers to a word or phrase extracted by mining processing. For example, when mining processing is performed on inherent portions, a feature word is extracted from the words determined as the inherent portions. The "feature level" shows the degree of how much the extracted feature word is distinctive in terms of an arbitrary category (a collection of records having a specific value in the supplementary information D3, for example).

In order to perform the above processing, the mining processing unit 10 includes a mining processing management unit 11, a feature word counting unit 12, a feature level calculation unit 13, and a mining result output unit 14. The feature word counting unit 12 counts the number of times each of the words determined as the inherent portions appears in corresponding text data or in all text data. Through this, the frequency of appearance and the total frequency of appearance are obtained (see FIG. 6).

In the example of FIG. 6, the counting of feature words is performed on a plurality of records. In Exemplary Embodiment 1, the number of records targeted for the counting of feature words is not particularly limited. Moreover, in the case where cross-channel text mining is not performed, the feature word counting unit 12 counts the frequencies of appearance of all words (excluding meaningless words) included in the speech-recognized text data or the call memo text data.

The feature level calculation unit 13 calculates the feature level (see FIG. 6), using the frequency of appearance and the total frequency of appearance obtained by the feature word counting unit 12. The method for calculating the feature level is not particularly limited, and a variety of statistical analysis techniques or the like may be used depending on the purpose of mining or the like.

Specifically, the feature word calculation unit 13 can calculate a statistical measure such as the frequency of appearance, a log-likelihood ratio, a $X^2$ value, a Yates correction $X^2$ value, point-wise mutual information, SE, or ESC as a feature quantity of each word in a specific category, and determine the calculated value as a feature level. Note that an example of the specific category includes a collection of records having a specific value designated by the analyst in the supplementary information D3, as mentioned above. Moreover, statistical analysis technology such as multiple regression analysis, principal component analysis, factor analysis, discriminant analysis, or cluster analysis may be used for the calculation of the feature level.

The mining processing management unit 11 receives mining conditions input by the user via the input device 15 and causes the feature word counting unit 12 and the feature level calculation unit 13 to operate in accordance with the received conditions. For example, in the case where the user has given an instruction to perform text mining on only inherent portions of the speech-recognized text data, the mining processing management unit 11 causes the feature word counting unit 12 to count the number of feature words using, as targets, the inherent portions of the speech-recognized text data. The mining processing management unit 11 also causes the feature level calculation unit 13 to calculate the feature levels for the inherent portions of the speech-recognized text data.

The mining result output unit 14 outputs mining results as shown in FIG. 6 to the output device 16. In FIG. 6, the mining results include the feature word, the frequency of appearance, the total frequency of appearance, and the feature level. In Exemplary Embodiment 1, since cross-channel text mining is performed, mining results for both of the speech-recognized text data and the call memo text data are output. Moreover, when the output device 16 is a display device, mining results are displayed on the display screen.

Figure 7:
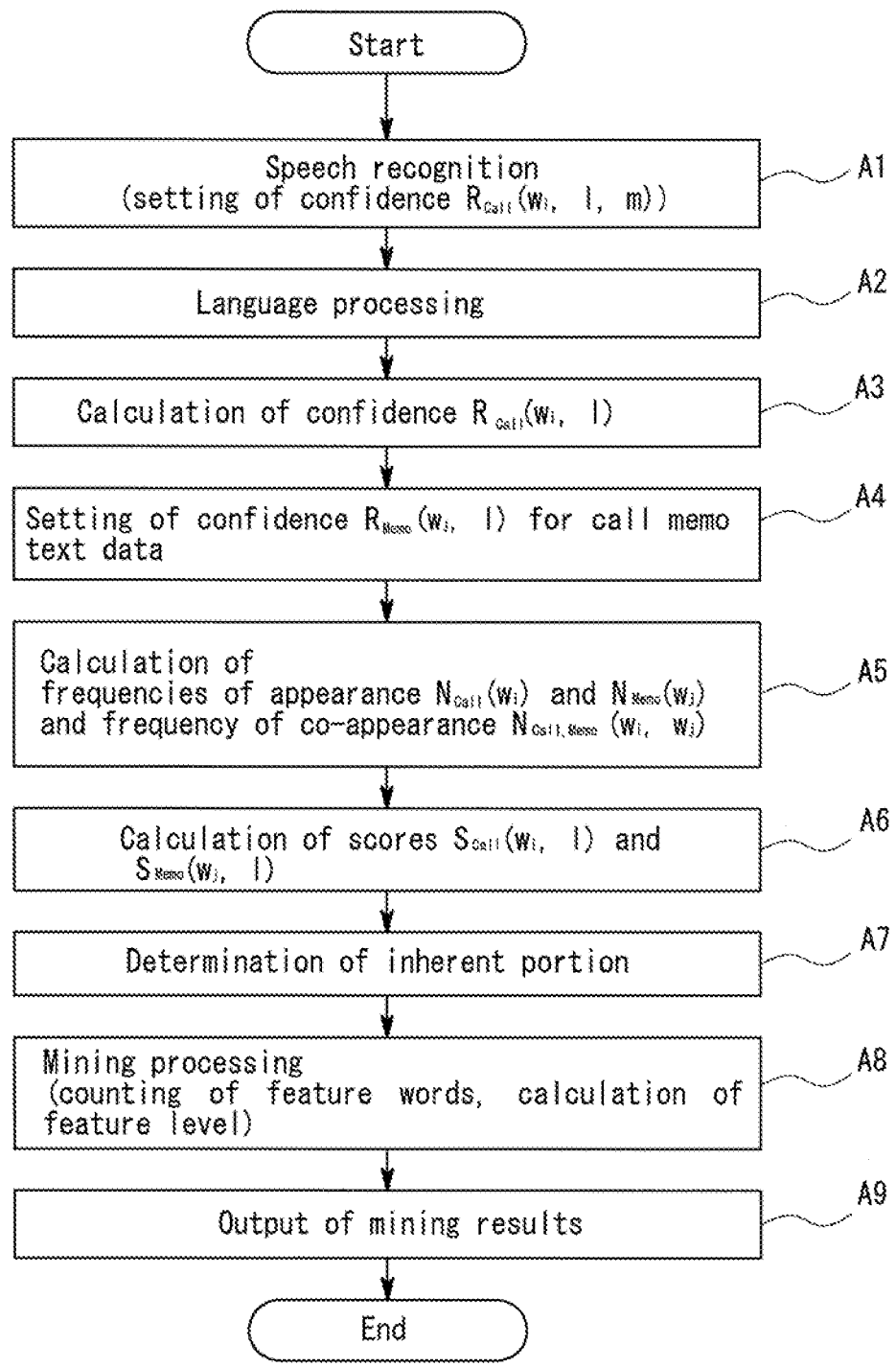
FIG. 7 is a flowchart showing a procedure of processing performed in accordance with a text mining method according to Exemplary Embodiment 1 of the present invention.

Next is a description of the text mining method according to Exemplary Embodiment 1 of the present invention with reference to FIG. 7. FIG. 7 is a flowchart showing a procedure of processing performed in accordance with the text mining method according to Exemplary Embodiment 1. of the present invention.

The text mining method according to Exemplary Embodiment 1 is implemented by causing the text mining apparatus 1 shown in FIG. 1 to operate. Therefore, the below description of the text mining method in Exemplary Embodiment 1 is given along with a description of the operation of the text mining apparatus 1 shown in FIG. 1 with reference to FIGS. 1 to 6 where appropriate.

First, the data input unit 2 of the text mining apparatus 1 receives an input of call audio data $D1(l)$, call memo text data $D2(l)$, and supplementary information $D3(l)$ for each of records (1) to (L). At this time, the call audio data $D1(l)$, the call memo text data $D2(l)$, and the supplementary information $D3(l)$ for each record l (l=1, 2, ..., L) with the same record number are grouped into one set, and are input one set at a time. Then, as shown in FIG. 7, the speech recognition unit 3 performs speech recognition and extracts words $w_i$ as candidates so as to generate speech-recognized text data (step A1).

Also in step A1, the confidence setting unit 4 sets confidence $R_{Call}(w_i, l, m)$ for each word $w_i$ constituting the speech-recognized text data. Note that step A1 is omitted in the case where speech-recognized text data in which confidence has been set for each word has already been created prior to input to the text mining apparatus 1.

Subsequently, the language processing unit 5 performs language processing on the call memo text data (step A2). Accordingly, the call memo text data is transformed into a word sequence of words $w_j$ and is output in the form of the word sequence. Alternatively, step A2 may be performed prior to or simultaneously with step A1.

The frequency calculation unit 7 then applies the confidence $R_{Call}(w_i, l, m)$ to the above-described equation (Equation 1) and calculates confidence $R_{Call}(w_i, l)$ of the words $w_i$ for each record l (step A3). Furthermore, the frequency calculation unit 7 also sets the confidence $R_{Memo}(w_j, l)$ for each word $w_j$ of the call memo text data (step A4).

Subsequently, the frequency calculation unit 7 obtains the frequencies of appearance $N_{Call}$ ($w_i$) and $N_{Memo}$ ($w_j$) of respective words $w_i$ and $w_j$ and the frequencies of co-appearance $N_{Call,Memo}$ ($w_i$, $w_j$) of the words $w_i$ and $w_j$ for every record (records (1) to (L)), based on the confidence $R_{Call}$($w_i$, l) of the words $w_i$ and the confidence $R_{Memo}$ ($w_j$, l) of the words $w_j$ (step A5). The above equations (Equations 2 to 4) are used in step A5.

Then, after the processing by the frequency calculation unit 7 (steps A3 to A5) has been completed, the score calculation unit 8 calculates the scores $S_{call}$($w_i$, l) and $S_{Memo}$ ($w_j$, l), based on the frequencies of appearance $N_{Call}$ ($w_i$) and $N_{Memo}$ ($w_j$) and the frequencies of co-appearance $N_{Call,Memo}$ ($w_i$, $w_j$) (step A6). The calculation of the scores $S_{call}$ ($w_i$, l) and $S_{Memo}$ ($w_j$, l) is performed for each of the records (1) to (L). Specifically, the score calculation unit 8 calculates the mutual information amounts I ($w_i$, $w_j$) using the above equations (Equations 5 to 8) and applies the mutual information amounts to the above equations (Equations 9 and 10) as described above. As a result of step A6, data as shown in FIG. 5 is obtained.

Then, the inherent portion determination unit 9 determines whether or not the scores $S_{call}$ ($w_i$, l) and $S_{Memo}$ ($w_j$, l) of the respective words for each of the records (1) to (L) is greater than or equal to the preset threshold values, and determines those words whose scores are greater than or equal to the threshold values as inherent portions (step A7). Such information that specifies words determined as inherent portions in step A7 is transmitted to the mining processing unit 10.

Thereafter, the mining processing unit 10 performs mining processing (step A8). Through the execution of step A8, processing of counting the number of feature words and calculation of the feature levels are performed. As a result of step A8, data as shown in FIG. 6 is obtained.

Thereafter, the mining result output unit 14 outputs the results obtained in step A8 to the output device 16 (step A9). After the execution of step A9, the text mining apparatus 1 ends the processing.

In this way, in the text mining method according to Exemplary Embodiment 1, the influence that recognition errors occurring during speech recognition have on the process of discrimination of inherent portions of speech-recognized text and inherent portions of non-speech-recognized text data is minimized. As a result, since discrimination accuracy of these inherent portions is improved, the text mining method according to Exemplary Embodiment 1 realizes cross-channel text mining that was conventionally difficult.

A program according to Exemplary Embodiment 1 may be any program as long as it includes instructions that cause a computer to execute steps A1 to A9 shown in FIG. 7. In this case, the text mining apparatus 1 is implemented by installing the program according to Exemplary Embodiment 1 on a computer and causing the computer to execute that program. Also in this case, the central processing unit (CPU) of the computer functions as the speech recognition unit 3, the language processing unit 5, the inherent portion extraction unit 6, and the mining processing unit 10, and performs the processing of steps A1 to A9.

Furthermore, the program according to Exemplary Embodiment 1 is supplied via a network or in a state of being stored in a computer-readable recording medium such as an optical disc, a magnetic disk, a magneto-optical disk, a semiconductor memory, or a floppy disk.

Exemplary Embodiment 2

Figure 8:
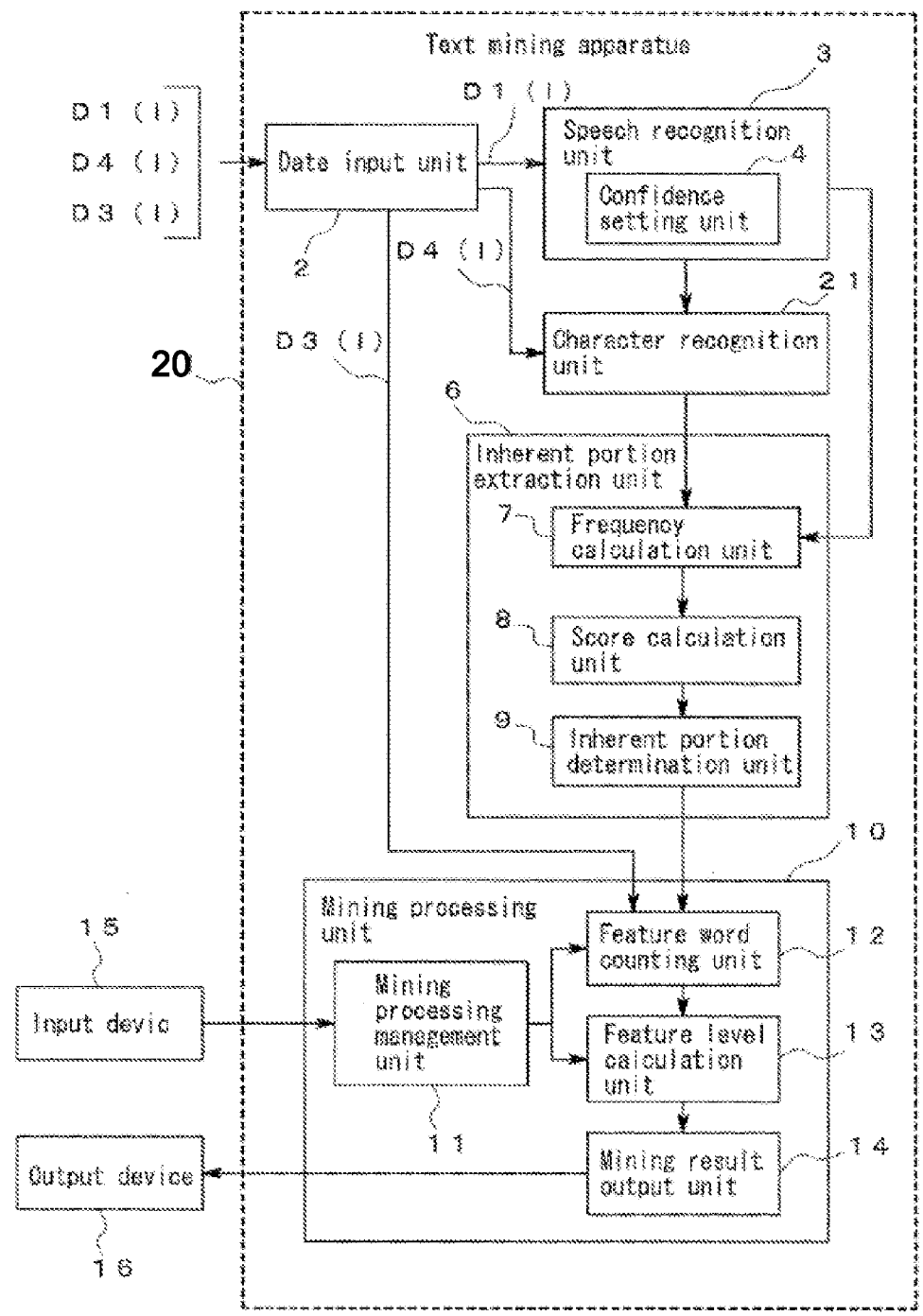
FIG. 8 is a block diagram showing a schematic configuration of a text mining apparatus according to Exemplary Embodiment 2 of the present invention.
Figure 9:
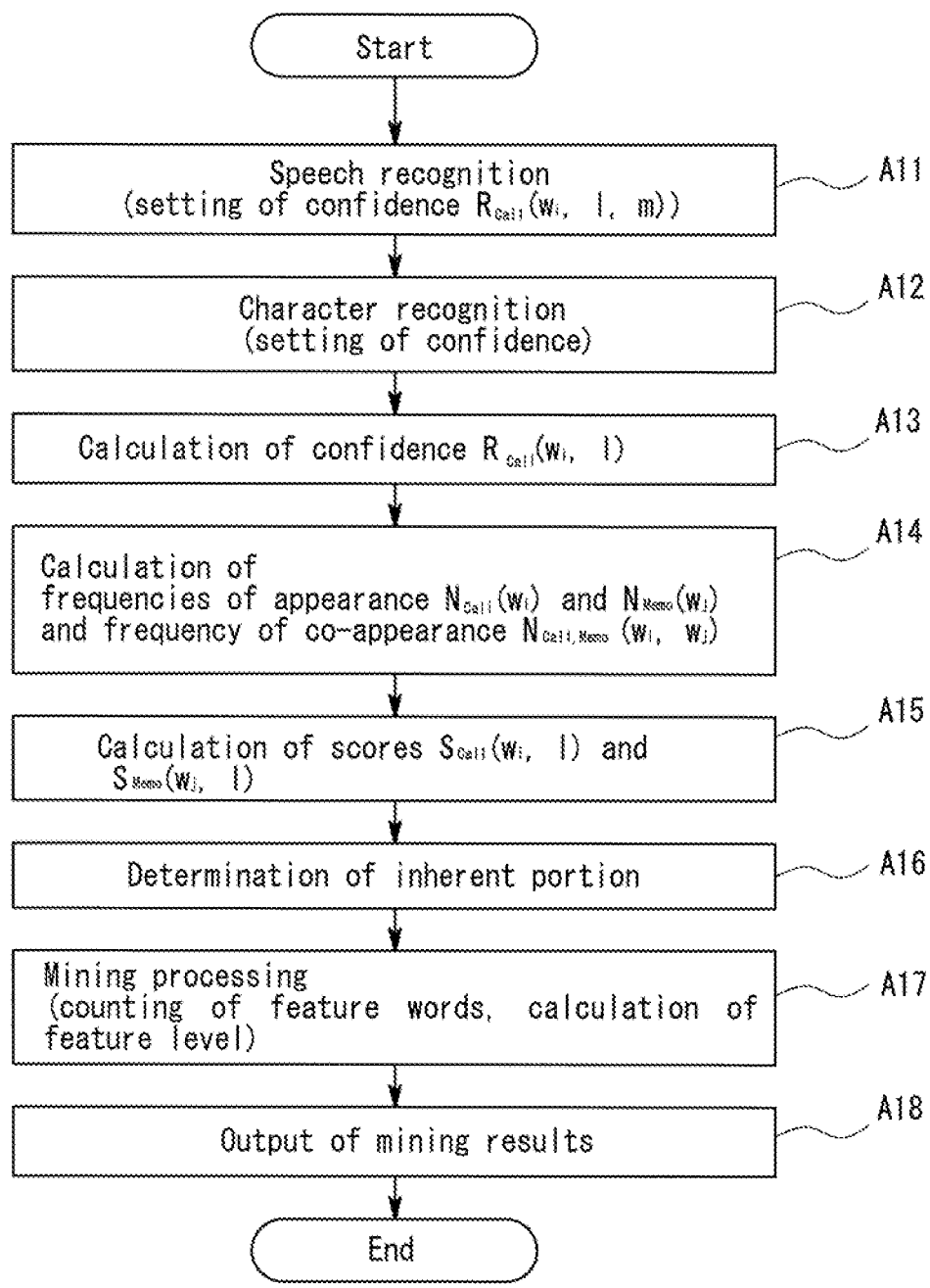
FIG. 9 is a flowchart showing a procedure of processing performed in accordance with a text mining method according to Exemplary Embodiment 2 of the present invention.

Next is a description of a text mining apparatus, a text mining method, and a program according to Exemplary Embodiment 2 of the present invention with reference to FIGS. 8 and 9. First, a description is given of the configuration of the text mining apparatus according to Exemplary Embodiment 2 of the present invention with reference to FIG. 8. FIG. 8 is a block diagram showing a schematic configuration of the text mining apparatus according to Exemplary Embodiment 2 of the present invention.

A text mining apparatus 20 shown in FIG. 8 uses speech-recognized text data and text data (character-recognized text data) obtained by character recognition as targets for mining. Therefore, the text mining apparatus 20 receives an input of document image data D4 that is output from an optical reader such as a scanner.

Note that in Exemplary Embodiment 2 as well, the text mining apparatus 20 receives an input of records with record numbers 1 to L. Moreover, call audio data D1(l) for a record with record number l (l=1, 2, . . . , L), image data D4(l) corresponding thereto, and supplementary information D3(l) likewise corresponding thereto are grouped into one set, and the text mining apparatus 20 receives an input of a plurality of such sets.

As shown in FIG. 8, the text mining apparatus 20 includes a character recognition unit 21, instead of the language processing unit 5 shown in FIG. 1 in Exemplary Embodiment 1, in order to perform character recognition on document image data D4(l) for each record l.

Similarly to Exemplary Embodiment 1, the text mining apparatus 20 in Exemplary Embodiment 2 is applied to a call center. Examples of a document as a source of image data D4(l) for each record l include hand-written memos created by operators and facsimiles sent from customers.

The character recognition unit 21 performs character recognition on the image data D4(l) for each record l and generates character-recognized text data for each record l. The character recognition unit 21 also extracts words constituting the character-recognized text data and sets confidence for each of the words. It is sufficient that the confidence in this case is an index of whether the word constituting the character-recognized text data is correct as a result of recognition of an input image.

Specifically, the confidence for each word in the character-recognized text data may be the posterior probability of the word in the case where input image data D4(l) or a feature quantity of character recognition observed from the input image data D4(l) has been given. More specifically, the posterior probability in this case may be an "estimated posterior probability" disclosed in NPL 3 above.

Note that the text mining apparatus 20 has the same configuration as the text mining apparatus 1 shown in FIG. 1, except the parts described above. Accordingly, the data input unit 2, the speech recognition unit 3, the inherent portion extraction unit 6, and the mining processing unit 10 function similarly to those described in the example of Exemplary Embodiment 1. In Exemplary Embodiment 2, the speech-recognized text data and the character-recognized text data are used to extract inherent portions, and thereafter cross-channel mining is performed.

Alternatively, in Exemplary Embodiment 2, a mode is possible in which character recognition is performed by a character recognition device outside the text mining apparatus 20, and character-recognized text data in which confidence has been set for each word has already been created prior to input to the text mining apparatus 20. In this case, it is not necessary for the text mining apparatus 20 to include the character recognition unit 21, and character-recognized text data is input via the data input unit 2 to the inherent portion extraction unit 6.

Next is a description of the text mining method according to Exemplary Embodiment 2 of the present invention with reference to FIG. 9. FIG. 9 is a flowchart showing a procedure of processing performed in accordance with the text mining method according to Exemplary Embodiment 2 of the present invention.

The text mining method according to Exemplary Embodiment 2 is implemented by causing the text mining apparatus 20 shown in FIG. 8 to operate. Therefore, the below description of the text mining method according to Exemplary Embodiment 2 is given along with a description of the operation of the text mining apparatus 20 shown in FIG. 8 with reference to FIGS. 1 to 6 where appropriate.

First, the data input unit 2 of the text mining apparatus 20 receives an input of call audio data D1($l$), image data D4($l$), and supplementary information D3($l$) for each of records (1) to (L). At this time, the call audio data D1($l$), the image data D4($l$), and the supplementary information D3($l$) for each record 1 ($l$=1, 2, . . . , L) with the same record number are grouped into one set, and are input one set at a time.

Next, as shown in FIG. 9, the speech recognition unit 3 generates speech-recognized text data as shown in FIG. 9 (step A11). Step A11 is the same as step A1 shown in FIG. 7.

Next, the character recognition unit 21 performs character recognition on the image data D4($l$) for each record 1 (step A12). Thereby character-recognized text data is generated from each piece of the image data D4($l$), and further words $w_j$ constituting the character-recognized text data is extracted and confidence for each of the words $w_j$ is set. Note that step A12 is omitted in the case where character-recognized text data in which confidence has been set for each word has already been created prior to input to the text mining apparatus 20. Alternatively, step A12 may be performed prior to or simultaneously with step A11.

Next, the frequency calculation unit 7 performs calculation of the confidence $R_{Call}(w_i, 1, m)$ (step A13) and calculation of frequencies of appearance $N_{Call}(w_i)$, frequencies of appearance $N_{Memo}(w_j)$, and frequencies of co-appearance $N_{Call, Memo}(w_i, w_j)$ (step A14). Steps A13 and A14 are respectively the same as steps A3 and A5 shown in FIG. 7.

Subsequently, the score calculation unit 10 calculates scores (step 15) and the inherent portion determination unit 9 determines inherent portions (step A16). Steps A15 and A16 are respectively the same as steps A6 and A7 shown in FIG. 7.

Thereafter, the mining processing unit 10 performs mining processing (step A17), and the mining result output unit 14 outputs mining results (step A18), so that the processing ends. Steps A11 and A18 are respectively the same as steps A8 and A9 shown in FIG. 7.

In this way, in Exemplary Embodiment 2, the inherent portions of the speech-recognized text data and the inherent portion of the character-recognized text data are accurately discriminated, and thus cross-channel text mining using the both as targets is realized.

A program according to Exemplary Embodiment 2 may be any program as long as it includes instructions that cause a computer to execute steps A11 to A18 shown in FIG. 9. In this case, the text mining apparatus 20 is implemented by installing the program according to Exemplary Embodiment 2 on a computer and causing the computer to execute that program. Also in this case, the central processing unit (CPU) of the computer functions as the speech recognition unit 3, the character recognition unit 21, the inherent portion extraction unit 6, and the mining processing unit 10, and performs processing of steps A11 to A18.

Moreover, the program according to Exemplary Embodiment 2 is supplied via a network or in a state of being stored in a computer-readable recording medium such as an optical disc, a magnetic disk, a magneto-optical disk, a semiconductor memory, or a floppy disk.

Although the examples where the text mining apparatus is applied to a call center have been shown in Exemplary Embodiments 1 and 2, example applications of the text mining apparatus are not limited thereto. The text mining apparatus is also applicable in cases such as where the perception of a company is to be analyzed based on content reported on TV or by radio, and where conversations in communication settings such as meetings are to be analyzed. In addition, although inherent portions are extracted from two pieces of text data in Exemplary Embodiments 1 and 2, the present invention is not intended to be limited thereto. For example, inherent portions may be extracted from three or more pieces of text data.

In the above Exemplary Embodiment 1, descriptions have been given of the examples in which a target for text mining is a set of speech-recognized text data that may include errors and call memo text data that includes no error. In the above Exemplary Embodiment 2, a description has been given of the example in which a target for text mining is a set of speech-recognized text data that may include errors and character-recognized text data that may include errors as well. The present invention is, however, not intended to be limited to those cases where targets are only the above-described combinations of text data, and text mining may be performed on data combinations other than the above-described combinations.

According to the present invention, the degree to which each word corresponds to an inherent portion of the text is calculated from each set of text data, based on the collection of words constituting each set of text data and the confidence thereof. Accordingly, other examples of a target for text mining include a set of speech-recognized text data corresponding to the call audio of an operator and speech-recognized text data corresponding to the call audio of a customer.

Furthermore, text data targeted for text mining may be text data other than speech-recognized text data, text data generated with key entry (call memo text data), and character-recognized text data. The present invention is applicable to even such text data as long as it is possible to extract words constituting the text data and further to set confidence for each of the words. Another specific example of such text data is text data obtained by mechanical translation.

Although the aspects of the present invention have been described with reference to Exemplary Embodiments 1 and 2, the present invention is not intended to be limited to Embodiments 1 and 2 described above. It should be noted that various modifications that are understandable for those skilled in the art can be made to the configuration and details of the present invention within the scope of the present invention.

This application is based upon and claims the benefit of priority from Japanese Patent Application No. 2008-222454 filed on Aug. 29, 2008, the disclosure of which is incorporated herein in its entirety by reference.

A text mining apparatus, a text mining method, and a computer-readable recording medium according to the present invention have the following features.

(1) The text mining apparatus is for performing text mining using, as targets, a plurality of text data pieces including a text data piece generated by computer processing, confidence being set for each of the text data pieces, the text mining apparatus including an inherent portion extraction unit that extracts an inherent portion of each text data piece relative to another of the text data pieces, using the confidence set for each of the text data pieces.

(2) With the text mining apparatus described in the above (1), for each word constituting each of the text data pieces, the inherent portion extraction unit calculates the degree to which the word corresponds to an inherent portion of the text data piece relative to another of the text data pieces, using the confidence that has been set for each of the text data pieces, and extracts an inherent portion of the text data piece relative to the other text data piece based on a calculated value.

(3) With the text mining apparatus described in the above (2), the inherent portion extraction unit calculates a frequency of appearance of each word constituting each of the text data pieces, using the confidence that has been set for each of the text data pieces, further calculates a frequency of co-appearance of a word constituting a piece of text data and a word constituting another piece of text data, using the confidence that has been set for each of the text data pieces, and calculates the degree based on the frequency of appearance and the frequency of co-appearance.

(4) With the text mining apparatus described in the above (3), where text mining is performed on two pieces of text data and where $w_i$ denotes a word constituting one piece of text data and $w_j$ denotes a word constituting the other piece, the inherent portion extraction unit calculates a mutual information amount $I(w_i; w_j)$ based on the frequency of appearance and the frequency of co-appearance, so as to use the mutual information amount $I(w_i; w_j)$ for calculation of the degree.

(5) With the text mining apparatus described in the above (1), a text data piece generated by speech recognition is used as the text data piece generated by computer processing, the text mining apparatus further including a confidence setting unit that sets the confidence for the text data piece generated by speech recognition, using a word graph obtained when performing speech recognition.

(6) The text mining apparatus described in the above (1) further includes a mining processing unit that separately performs text mining of the inherent portion of each of the text data pieces.

(7) The text mining method is for performing text mining using, as targets, a plurality of text data pieces including a text data piece generated by computer processing, the text mining method including the steps of (a) setting confidence for each of the text data pieces, and (b) extracting an inherent portion of each text data piece relative to another of the text data pieces, using the confidence set for each of the text data pieces in the step (a).

(8) In the text mining method described in the above (7), in the step (b), for each word constituting each of the text data pieces, the degree to which the word corresponds to an inherent portion of the text data piece relative to another of the text data pieces is calculated, using the confidence that has been set for each of the text data pieces, and an inherent portion of the text data piece relative to the other text data piece is extracted based on a calculated value.

(9) In the text mining method described in the above (8), in the step (b), a frequency of appearance of each word constituting each of the text data pieces is calculated using the confidence that has been set for each of the text data pieces in the step (a), a frequency of co-appearance of a word constituting a piece of text data and a word constituting another piece of text data is further calculated using the confidence that has been set for each of the text data pieces, and then the degree is calculated based on the frequency of appearance and the frequency of co-appearance.

(10) In the text mining method described in the above (9), where text mining is performed on two pieces of text data and where $w_i$ denotes a word constituting one piece of text data and $w_j$ denotes a word constituting the other piece, a mutual information amount $I(w_i; w_j)$ is calculated based on the frequency of appearance and the frequency of co-appearance, so as to use the mutual information amount $I(w_i; w_j)$ for calculation of the degree in the step (b).

(11) In the text mining method described in the above (7), a text data piece generated by speech recognition is used as the text data piece generated by computer processing, and the confidence is set for the text data piece generated by speech recognition, using a word graph obtained when performing speech recognition in the step (a).

(12) The text mining method described in the above (7) further includes the step of separately performing text mining of the inherent portion of each of the text data pieces.

(13) The computer-readable recording medium records a program for causing a computer device to perform text mining using, as targets, a plurality of text data pieces including a text data piece generated by computer processing, the program including instructions that cause the computer device to perform the steps of (a) setting confidence for each of the text data pieces, and (b) extracting an inherent portion of each text data piece relative to another of the text data pieces, using the confidence set for each of the text data pieces in the step (a).

(14) With the computer-readable recording medium described in the above (13), in the step (b), for each word constituting each of the text data pieces, the degree to which the word corresponds to an inherent portion of the text data piece relative to another of the text data pieces is calculated, using the confidence that has been set for each of the text data pieces, and an inherent portion of the text data piece relative to the other text data piece is extracted based on a calculated value.

(15) With the computer-readable recording medium described in the above (14), in the step (b), a frequency of appearance of each word constituting each of the text data pieces is calculated using the confidence that has been set for each of the text data pieces in the step (a), a frequency of co-appearance of a word constituting a piece of text data and a word constituting another piece of text data is further calculated using the confidence that has been set for each of the text data pieces, and then the degree is calculated based on the frequency of appearance and the frequency of co-appearance.

(16) With the computer-readable recording medium described in the above (15), where text mining is performed on two pieces of text data and where $w_i$ denotes a word constituting one piece of text data and $w_j$ denotes a word constituting the other piece, a mutual information amount $I(w_i; w_j)$ is calculated based on the frequency of appearance and the frequency of co-appearance, so as to use the mutual information amount $I(w_i; w_j)$ for calculation of the degree in the step (b).

(17) With the computer-readable recording medium described in the above (13), a text data piece generated by speech recognition is used as the text data piece generated by computer processing, and the confidence is set for the text data piece generated by speech recognition, using a word graph obtained when performing speech recognition in the step (a).

(18) With the computer-readable recording medium described in the above (13), the program further includes an instruction that causes the computer device to perform the step of separately performing text mining of the inherent portion of each of the text data pieces.

DESCRIPTION OF REFERENCE NUMERALS

1 Text mining apparatus (Exemplary Embodiment 1)
2 Data input unit

3 Speech recognition unit
4 Confidence setting unit
5 Language processing unit
6 Inherent portion extraction unit
7 Frequency calculation unit
8 Score calculation unit
9 Inherent portion determination unit
10 Mining processing unit
11 Mining processing management unit
12 Feature word counting unit
13 Feature level calculation unit
14 Mining result output unit
15 Input device
16 Output device
20 Text mining apparatus (Exemplary Embodiment 2)
21 Character recognition unit
D1($l$) Call audio data
D2($l$) Call memo text data
D3($l$) Supplementary information
D4($l$) Image data

The invention claimed is:

1. A text mining apparatus for performing text mining, comprising:
at least one input that receives a first text data and a second text data, each word of the first and second text data has a confidence; and
a processor configured to calculate a mutual information amount $I(w_i, w_j)$ at least based on a frequency of appearance of word $w_i$ in the first text data $N_{1st}(w_i)$, a frequency of appearance of word $w_j$ in the second text data $N_{2nd}(w_j)$, and a frequency of co-appearance of $w_i$ and $w_j$ in both text data $N_{1st,2nd}(w_i,w_j)$ using the confidence of $w_j$, and the confidence of and use the mutual information amount $I(w_i, w_j)$ to calculate degrees to which $w_i$ and $w_j$ correspond to inherent portions of the first and second text data,
wherein $$N_{1st}(w_i) = \sum_l R_{1st}(w_i, l), \quad \text{[Equation A]}$$

$$N_{2nd}(w_j) = \sum_l R_{2nd}(w_j, l), \quad \text{[Equation B]}$$

$$N_{1st,2nd}(w_i, w_j) = \sum_l R_{1st}(w_i, l)R_{2nd}(w_j, l), \quad \text{[Equation C]}$$

$R_{1st}(w_i,l)$ indicates a confidence of $w_i$ for record l,
$R_{2nd}(w_j,l)$ indicates a confidence of $w_j$ for record l.

2. The text mining apparatus of claim 1, wherein one of the first and second text data is generated by computer processing.

3. The text mining apparatus of claim 2, wherein the one of the first and second text data is generated by speech recognition.

4. The text mining apparatus according to claim 3, the processor further configured to set confidences for the words of the one of the first and second text data generated by speech recognition, using a word graph obtained during the speech recognition.

5. The text mining apparatus according to claim 1, the processor further configured to separately perform text mining of the inherent portions of the first and second text data.

6. A text mining method for performing text mining on a first text data and a second text data, wherein each word of the first and second text data has a confidence, comprising (a) calculating a mutual information amount $I(w_i, w_j)$ at least based on a frequency of appearance of word $w_i$ in the first text data $N_{1st}(w_i)$, a frequency of appearance of word $w_j$ in the second text data $N_{2nd}(w_j)$, and a frequency of co-appearance of $w_i$ and $w_j$ in both text data $N_{1st,2nd}(w_i, w_j)$ using the confidence of $w_i$ and the confidence of $w_j$; and
(b) using the mutual information amount $I(w_i, w_j)$ to calculate degrees to which $w_i$ and $w_j$ correspond to inherent portions of the first and second text data,
wherein $$N_{1st}(w_i) = \sum_l R_{1st}(w_i, l), \quad \text{[Equation A]}$$

$$N_{2nd}(w_j) = \sum_l R_{2nd}(w_j, l), \quad \text{[Equation B]}$$

$$N_{1st,2nd}(w_i, w_j) = \sum_l R_{1st}(w_i, l)R_{2nd}(w_j, l), \quad \text{[Equation C]}$$

$R_{1st}(w_i,l)$ indicates a confidence of $w_i$ for record l,
$R_{2nd}(w_j,l)$ indicates a confidence of $w_j$ for record l.

7. The text mining method of claim 6, wherein one of the first and second text data is generated by computer processing.

8. The text mining method of claim 7, wherein the one of the first and second text data is generated by speech recognition.

9. The text mining method according to claim 8, further comprising setting confidences for the words of the one of the first and second text data generated by speech recognition, using a word graph obtained during the speech recognition.

10. The text mining method according to claim 6, further comprising separately performing text mining of the inherent portions of the first and second text data.

11. A non-transitory computer-readable medium comprising a program for performing operations on a first text data and a second text data, wherein each word of the first and second text data has a confidence, the program including instructions operable to, when executed by a computing device, cause the computing device to:

(a) calculate a mutual information amount $I(w_i, w_j)$ at least based on a frequency of appearance of word $w_i$ in the first text data $N_{1st}(w_i)$, a frequency of appearance of word $w_j$ in the second text data $N_{2nd}(w_j)$, and a frequency of co-appearance of $w_i$ and $w_j$ in both text data $N_{1st,2nd}(w_i,w_j)$ using the confidence of $w_i$ and the confidence of $w_j$; and
(b) use the mutual information amount $I(w_i, w_j)$ to calculate degrees to which $w_i$ and $w_j$ correspond to inherent portions of the first and second text data,
wherein $$N_{1st}(w_i) = \sum_l R_{1st}(w_i, l), \quad \text{[Equation A]}$$

$$N_{2nd}(w_j) = \sum_l R_{2nd}(w_j, l), \quad \text{[Equation B]}$$

$$N_{1st,2nd}(w_i, w_j) = \sum_l R_{1st}(w_i, l)R_{2nd}(w_j, l), \quad \text{[Equation C]}$$

$R_{1st}(w_i,l)$ indicates a confidence of $w_i$ for record l,
$R_{2nd}(w_j,l)$ indicates a confidence of $w_j$ for record l.

12. The non-transitory computer-readable medium of claim 11, wherein one of the first and second text data is generated by computer processing.

13. The non-transitory computer-readable medium of claim 12, wherein the one of the first and second text data is generated by speech recognition.

14. The non-transitory computer-readable medium according to claim 13, wherein confidences are set for the words of the one of the first and second text data generated by speech recognition, using a word graph obtained during the speech recognition.

15. The computer-readable medium according to claim 11, the program further including instructions operable to, when executed by the computing device, cause the computing device to separately perform text mining of the inherent portions of the first and second text data.

16. The text mining apparatus of claim 1, wherein the first and second text data originate from a same event via different channels.

17. The text mining apparatus of claim 1, wherein the processor extracts the inherent portions based on the calculated degrees.

18. The text mining method of claim 6, wherein the first and second text data originate from a same event via different channels.

19. The text mining method of claim 6, further comprising:
(c) extracting the inherent portions based on the calculated degrees.

20. The non-transitory computer-readable medium of claim 11, wherein the first and second text data originate from a same event via different channels.

21. The non-transitory computer-readable medium of claim 11, the program further including instructions operable to, when executed by the computing device, cause the computing device to:
(c) extract the inherent portions based on the calculated degrees.

22. The text mining apparatus of claim 1, wherein:

$$I(w_i; w_j) = P_{1st,2nd}(w_i, w_j)$$

$$\log\frac{P_{1st,2nd}(w_i, w_j)}{P_{1st}(w_i)P_{2nd}(w_j)} + [P_{1st}(w_i) - P_{1st,2nd}(w_i, w_j)]$$

$$\log\frac{[P_{1st}(w_i) - P_{1st,2nd}(w_i, w_j)]}{P_{1st}(w_i)[1.0 - P_{2nd}(w_j)]} + [P_{2nd}(w_j) -$$

$$P_{1st,2nd}(w_i, w_j)]$$

$$\log\frac{[P_{2nd}(w_j) - P_{1st,2nd}(w_i, w_j)]}{[1.0 - P_{1st}(w_i)]P_{2nd}(w_j)} + [1.0 -$$

$$P_{1st}(w_i) - P_{2nd}(w_j) + P_{1st,2nd}(w_i, w_j)]$$

$$\log\frac{[1.0 - P_{1st}(w_i) - P_{2nd}(w_j) + P_{1st,2nd}(w_i, w_j)]}{[1.0 - P_{1st}(w_i)][1.0 - P_{2nd}(w_j)]},$$ [Equation D]

$$P_{1st}(w_i) = N_{1st}(w_i)/L,$$ [Equation E]

$$P_{2nd}(w_j) = N_{2nd}(w_j)/L,$$ [Equation F]

$$P_{1st,2nd}(w_i, w_j) = N_{1st,2nd}(w_i, w_j)/L,$$ [Equation G]

l is any natural number from 1 to L.

23. The text mining apparatus of claim 1, wherein:

$$R_{1st}(w_i, l) = 1.0 - \prod_m (1.0 - R_{1st}(w_i, l, m)),$$ [Equation H]

$$R_{2nd}(w_j, l) = 1.0 - \prod_m (1.0 - R_{2nd}(w_j, l, m)),$$ [Equation I]

m is a time frame of record l.

24. The text mining method of claim 6, wherein:

$$I(w_i; w_j) = P_{1st,2nd}(w_i, w_j)\log\frac{P_{1st,2nd}(w_i, w_j)}{P_{1st}(w_i)P_{2nd}(w_j)} + [P_{1st}(w_i) -$$

$$P_{1st,2nd}(w_i, w_j)]\log\frac{[P_{1st}(w_i) - P_{1st,2nd}(w_i, w_j)]}{P_{1st}(w_i)[1.0 - P_{2nd}(w_j)]} +$$

$$[P_{2nd}(w_j) - P_{1st,2nd}(w_i,$$

$$w_j)]\log\frac{[P_{2nd}(w_j) - P_{1st,2nd}(w_i, w_j)]}{[1.0 - P_{1st}(w_i)]P_{2nd}(w_j)} +$$

$$[1.0 - P_{1st}(w_i) - P_{2nd}(w_j) + P_{1st,2nd}(w_i,$$

$$w_j)]\log\frac{[1.0 - P_{1st}(w_i) - P_{2nd}(w_j) + P_{1st,2nd}(w_i, w_j)]}{[1.0 - P_{1st}(w_i)][1.0 - P_{2nd}(w_j)]},$$ [Equation D]

$$P_{1st}(w_i) = N_{1st}(w_i)/L,$$ [Equation E]

$$P_{2nd}(w_j) = N_{2nd}(w_j)/L,$$ [Equation F]

$$P_{1st,2nd}(w_i, w_j) = N_{1st,2nd}(w_i, w_j)/L,$$ [Equation G]

l is any natural number from 1 to L.

25. The text mining method of claim 6, wherein:

$$R_{1st}(w_i, l) = 1.0 - \prod_m (1.0 - R_{1st}(w_i, l, m)),$$ [Equation H]

$$R_{2nd}(w_j, l) = 1.0 - \prod_m (1.0 - R_{2nd}(w_j, l, m)),$$ [Equation I]

m is a time frame of record l.

26. The non-transitory computer-readable medium of claim 11, wherein:

$$I(w_i; w_j) =$$

$$P_{1st,2nd}(w_i, w_j)\log\frac{P_{1st,2nd}(w_i, w_j)}{P_{1st}(w_i)P_{2nd}(w_j)} + [P_{1st}(w_i) - P_{1st,2nd}(w_i,$$

$$w_j)]\log\frac{[P_{1st}(w_i) - P_{1st,2nd}(w_i, w_j)]}{P_{1st}(w_i)[1.0 - P_{2nd}(w_j)]} +$$

$$[P_{2nd}(w_j) - P_{1st,2nd}(w_i,$$

$$w_j)]\log\frac{[P_{2nd}(w_j) - P_{1st,2nd}(w_i, w_j)]}{[1.0 - P_{1st}(w_i)]P_{2nd}(w_j)} +$$

$$[1.0 - P_{1st}(w_i) - P_{2nd}(w_j) + P_{1st,2nd}(w_i,$$

$$w_j)]\log\frac{[1.0 - P_{1st}(w_i) - P_{2nd}(w_j) + P_{1st,2nd}(w_i, w_j)]}{[1.0 - P_{1st}(w_i)][1.0 - P_{2nd}(w_j)]},$$ [Equation D]

$$P_{1st}(w_i) = N_{1st}(w_i)/L,$$ [Equation E]

$$P_{2nd}(w_j) = N_{2nd}(w_j)/L,$$ [Equation F]

$$P_{1st,2nd}(w_i, w_j) = N_{1st,2nd}(w_i, w_j)/L,$$ [Equation G]

l is any natural number from 1 to L.

27. The non-transitory computer-readable medium of claim 11, wherein:

$$R_{1st}(w_i, l) = 1.0 - \prod_m (1.0 - R_{1st}(w_i, l, m)),$$ [Equation H]

$$R_{2nd}(w_j, l) = 1.0 - \prod_m (1.0 - R_{2nd}(w_j, l, m)),$$ [Equation I]

m is a time frame of record l.

\* \* \* \* \*